Jan. 17, 1961

C. MEIER 2,968,222

ROCKETS CARRIED IN CLUSTERS BY A LAUNCHING
MACHINE AND IN PARTICULAR BY AN AIRCRAFT

Filed Aug. 20, 1958

INVENTOR
Claude Meier
BY
Larson and Taylor
ATTORNEY

Jan. 17, 1961 C. MEIER 2,968,222
ROCKETS CARRIED IN CLUSTERS BY A LAUNCHING
MACHINE AND IN PARTICULAR BY AN AIRCRAFT
Filed Aug. 20, 1958 4 Sheets-Sheet 2
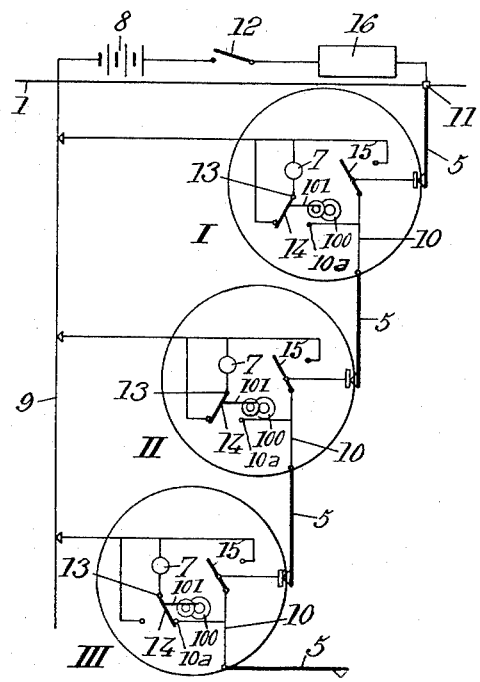
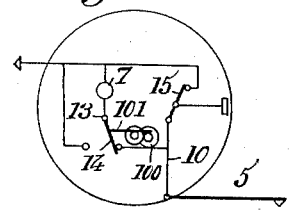
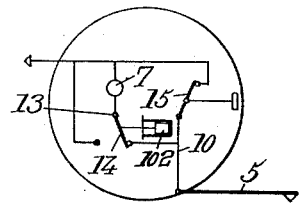
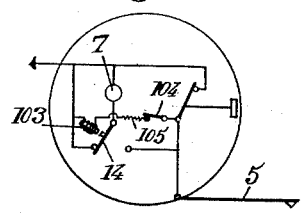
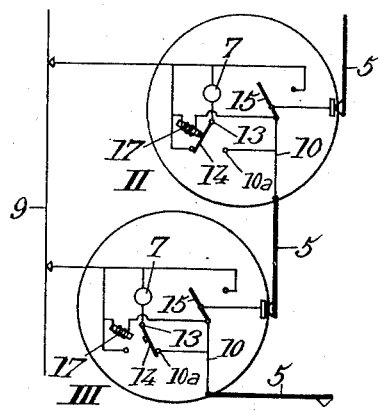
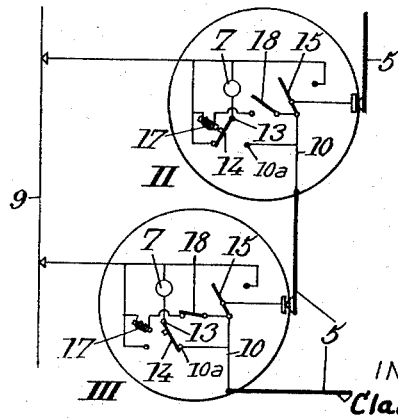
INVENTOR
Claude Meier
BY
ATTORNEY

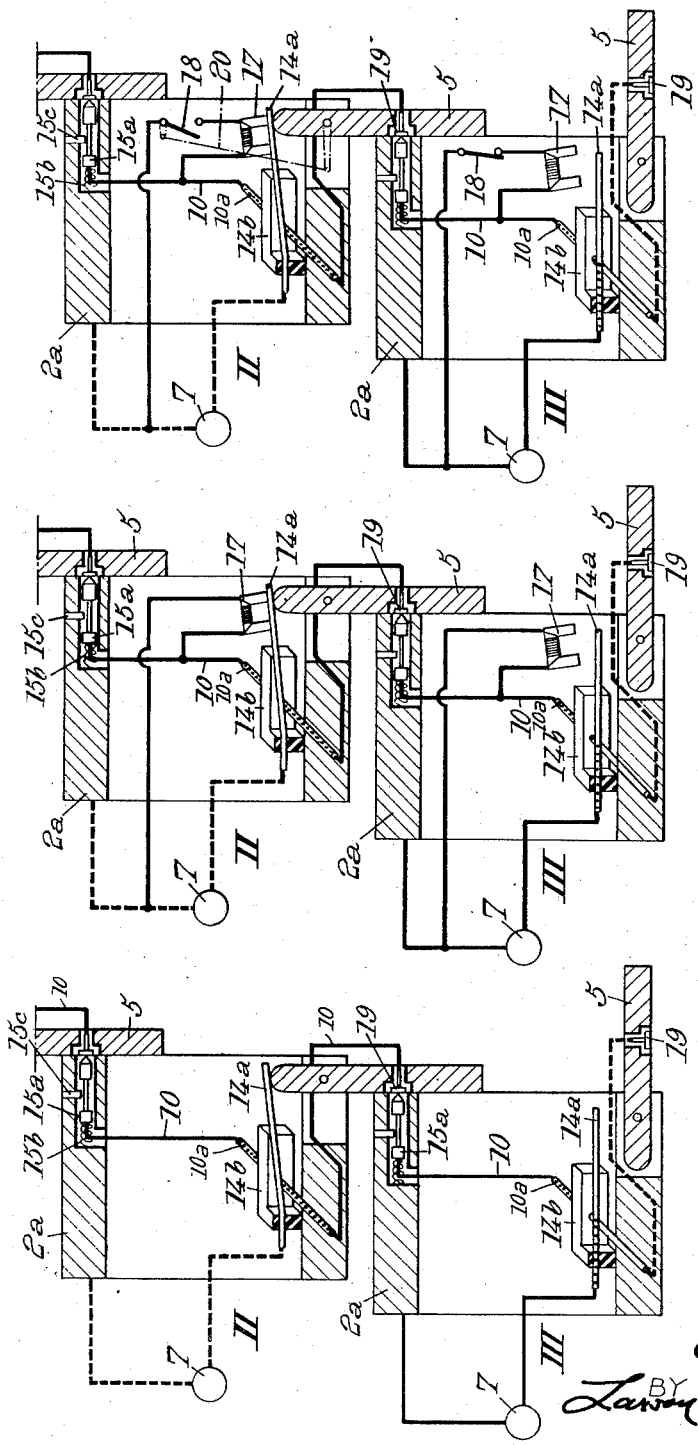

Jan. 17, 1961

C. MEIER 2,968,222

ROCKETS CARRIED IN CLUSTERS BY A LAUNCHING
MACHINE AND IN PARTICULAR BY AN AIRCRAFT

Filed Aug. 20, 1958

INVENTOR
Claude Meier

BY
Larson and Taylor
ATTORNEY

United States Patent Office 2,968,222
Patented Jan. 17, 1961

2,968,222
ROCKETS CARRIED IN CLUSTERS BY A LAUNCHING MACHINE AND IN PARTICULAR BY AN AIRCRAFT

Claude Meier, Geneva, Switzerland, assignor to Brevets Aero-Mecaniques S.A., Geneva, Switzerland, a Swiss society Filed Aug. 20, 1958, Ser. No. 756,160
Claims priority, application Switzerland Aug. 27, 1957
10 Claims. (Cl. 89—1.7)

The present invention relates to rockets carried in clusters by a launching machine and in particular an aircraft. A cluster of rockets, in the meaning given to this term in the present description, is constituted by two or more rockets each of which is supported either by another rocket or by an element of said launching machine (which will be hereinafter called "support") and is supporting another rocket, these rockets being intended to be fired successively, the last supported rocket being the first to be fired.

The object of the invention is to provide a combination of rockets of this kind which is better adapted to meet the requirements of practice than those known up to this time, in particular concerning control of the firing thereof.

The present invention is concerned with a cluster of rockets the electrical ignition of which is performed through an ignition circuit fed from an electrical source carried by the launching machine and extending from one rocket of the cluster to the next one as far as the last supported rocket, which is to be fired first, each rocket ignition device being arranged so that, as long as a rocket supports another rocket, said ignition circuit does not pass through the electrically operative primer of said supporting rocket whereas, for said last supported rocket, which therefore does not support another rocket, said ignition circuit passes through the primer thereof, whereby a current pulse sent from said source through said ignition circuit operates said last supported rocket primer without acting upon the primers of the other rockets as long as said last rocket has not been fired and detached from the cluster of rockets.

According to the present invention, the ignition device of the rocket includes delay means for retarding the operation of said primer, when the rocket that is being considered becomes the first one to be fired, for a time which is either predetermined or fixed by the person who controls firing.

Preferred embodiments of the present invention will be hereinafter described with reference to the accompanying drawings, given merely by way of example and in which:

Fig. 3 shows the lay-out of an ignition device according to the invention for three rockets belonging to the same cluster.

Fig. 4a diagrammatically shows the ignition device of a rocket before said rocket is incorporated in a cluster.

Figs. 4b and 4c are similar views corresponding to two modifications.

Figs. 5 and 6 are the lay-outs of the ignition devices of two systems including each two rockets of a cluster, these ignition devices being made according to two other embodiments of the invention.

Figs. 7, 8 and 9 are axial sectional views of the rear portions of two rockets one of which supports the other, these views corresponding respectively to three embodiments of the ignition device diagrammatically illustrated by Figs. 3, 5 and 6.

Figure 10:
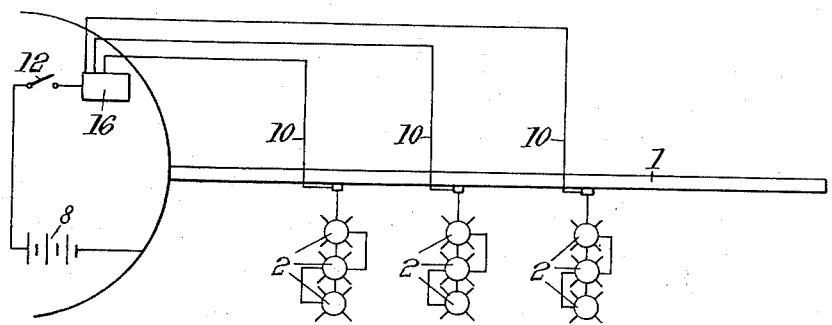

Fig. 10 is a diagrammatical view of a first embodiment of the general arrangement of the ignition means in the case of three clusters of rockets hanging under the wing of an aircraft.

Figure 11:
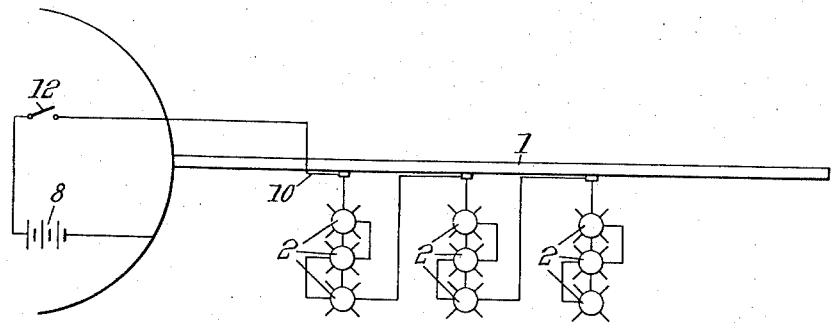

Fig. 11 shows a modification of the arrangement of Fig. 10.

The rockets to be used according to the present invention may be of any suitable type and, in particular, as illustrated, they include a body 2 provided at the rear with a nozzle $2a$ through which escapes the jet of combustion gases supplied by the propelling charge of the rocket.

Figure 1:
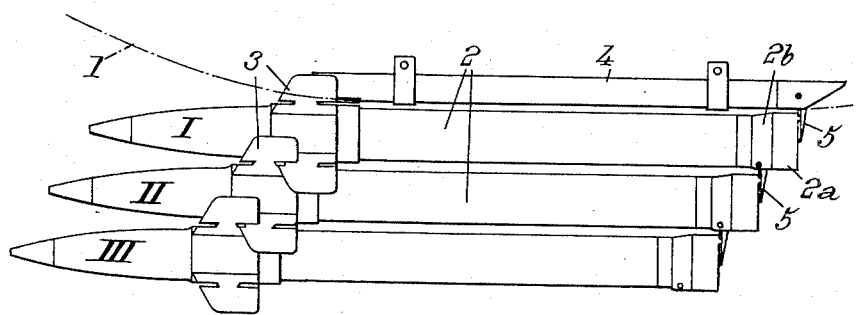
Fig. 1 is a diagrammatic elevational view showing a cluster of rockets mounted under the wing of an aircraft, said rockets being provided with an ignition device made according to the invention.

A cluster of such rockets is shown on Fig. 1 mounted under the wing 1 of an aircraft.

The devices for assembling each rocket with those located above and below it may be, as known, divided into a front portion and a rear portion, the front portion being advantageously constituted, for every rocket, by a sliding tail unit 3 which is temporarily mounted, before launching, in a forward position and acts as a guide for the rocket body during the beginning of launching, said sliding tail unit being carried along by the rear portion of the rocket, including a frusto-conical portion $2b$, when it comes to engage said tail unit so that it then occupies the position which it is to have on the rocket body and where it remains during the flight of the rocket.

Said tail units 3 are each supported by the tail unit of the rocekt located above it, or, for the top rocket I, by a support 4 fixed under the wing of the aircraft.

Each rocket 2, and also support 4, includes a retractable plate 5 dimensioned and positioned in such manner that the plate of a rocket such as II extends sufficiently into the propelling jet of the next rocket III located thereunder and supposed to be ignited, the plate 5 carried by support 4 extending into the propelling jet of the upper rocket I of the cluster when said upper rocket I is ignited in its turn.

Figure 2:
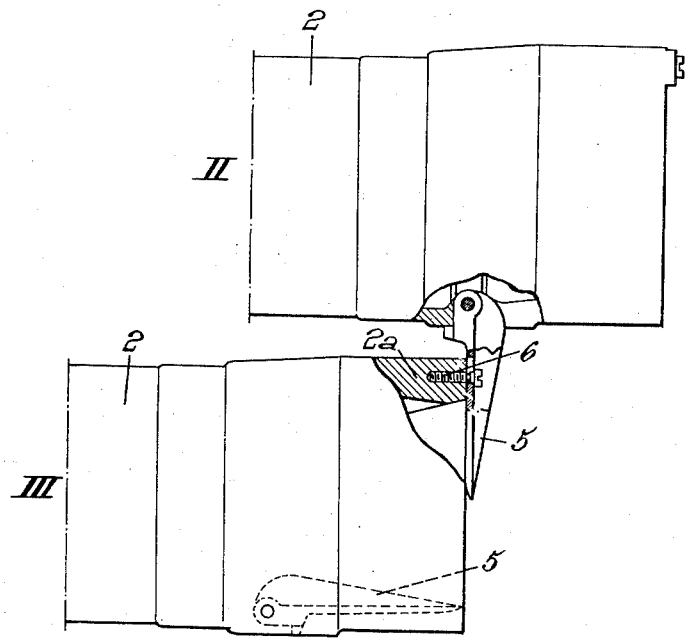
Fig. 2 shows, on an enlarged scale, in a more detailed fashion with parts in section, the rear portions of two rockets disposed one above the other.

As shown by Fig. 2, every plate 5 of a rocket, such as II, is connected to the nozzle $2a$ of the rocket located thereunder (in this case, rocket III) through axial holding means, such as a screw 6, capable of yielding under the combined effects of the thrust $p$ exerted on plate 5 and of the propelling thrust P acting upon said rocket III in the forward direction, said axial holding means being, on the contrary, capable of resisting the combined effects of forces $p$ and P upon rocket I.

With such an arrangement, ignition of rocket III will cause screw 6 to be broken, thus releasing said rocket III, the screws 6 of the other rockets being not broken by this ignition because they are only subjected to efforts equal to the difference P—$p$.

Of course, when a cluster of rockets as illustrated by Fig. 1 is ignited, the first rocket to be fired will be rocket III, then, after this rocket III has been launched, rocket II, and finally, after rocket II has been in turn launched, rocket I directly carried by support 4.

The ignition device of a cluster of rockets as shown by Fig. 1 is illustrated on Fig. 3, where the rockets III, II, I are represented by three circumferences, respectively.

Each rocket includes a primer 7 which promotes ignition of the propelling charge of said rocket, said primer being capable of being operated under the effect of an electric current flowing therethrough and supplied from an electrical source 8 located on the launching aircraft. On Fig. 3, the metallic structure of the system is conventionally represented by conductor 9.

In order to produce the successive ignitions of rockets III, II, I, there is provided a single circuit 10 starting from a point 11 located on the aircraft, said point being itself connected to one terminal of the electrical source 8. Said circuit 10 extends from point 11 to the last suspended rocket (that is to say rocket III on Fig. 3).

As long as a rocket supports another rocket (case of rockets I and II), the circuit means from source 8 do not pass through the primer of such a supporting rocket. Advantageously, in this case, both of the terminals of the rocket ignition device primer are connected with the metallic structure of the system (earthed). On the contrary, in the last suspended rocket (which is the first to be fired), the circuit means are connected with one of the terminals of the ignition device primer, the other terminal of said primer being connected with the metallic structure 9, which is itself connected with the other terminal of source 8.

With such an ignition device, it suffices to send current pulses through circuit 10, for instance by means of a control switch 12 interposed between source 8 and point 11, to fire all the rockets of the cluster successively in the order III, II, I. Therefore, in a cluster of rockets arranged as above described, all the rockets, with the exception of the first one to be fired (i.e. the last suspended one), are in the same condition concerning their ignition device (primer 7 placed out of the ignition circuit and having both of its terminals earthed), the state of the last suspended rocket being different due to the fact that its primer is inserted between the metallic structure (earth) 9 and circuit 10.

Now, in the case of a cluster of rockets the rear ends of which are connected together through retractable plates 5, the plates of all the rockets, with the exception of that of the last supported one, are in active position, whereas the plate of the last supported rocket is in retracted position.

In view of this, it is advantageous, in the case of rockets assembled in this way, to make use of the retraction movement undergone by plate 5, when a rocket passes from the state of supporting rocket to that of the last supported rocket, to produce the connection changes necessary to insert its primer into circuit 10.

On the other hand, it will be of interest, in particular to avoid static discharges through the primer 7 when the rocket is being stored up or transported, to arrange the ignition device so that primer 7 then has both of its terminals connected with the metallic structure (grounded.)

With such an arrangement, the ignition device of each rocket must undergo, between the time when the rocket is thus stored up and that when it is inserted in a cluster so as to support another rocket, two successive changes, to wit:

a first, taking place when the rocket is hung at the end of the cluster, that is to say when it is the last suspended rocket, this first change consisting in the fact that one of the terminals of the primer of the rocket ceases to be connected with the metallic structure (grounded) to become connected with circuit 10;

a second change, taking place when another rocket is suspended to that above considered, the latter then ceasing to be the last suspended rocket and the above mentioned terminal of each primer being once more connected with the metallic structure of the system (grounded).

The first of the two above mentioned changes is obtained by providing, between the terminal 13 of primer 7 and the portion of circuit 10 belonging to the rocket that is being considered, switch means 14 capable of occupying two positions. In one of these positions (shown for rocket III), terminal 13 is connected by switch 14 with a contact 10a belonging to said portion of circuit 10. In the other position (shown for rockets I and II), said terminal 13 is connected with the metallic structure of the system (earthed) 9, through the arm of switch 14. Switch 14 is made to pass from one to the other of these two positions by the action of plate 5 moving from its retracted position (case of rocket III) to its active position (case of rockets I and II).

As for the second change of state, it may be obtained by providing each rocket with a second switch 15 capable of occupying two positions. In one of these positions (Fig. 4a), the portion of circuit 10 belonging to the rocket is connected with the metallic structure of the system (grounded), whereas in the second of these positions of switch 15, which is that achieved when the rocket is incorporated into the cluster (case of rockets I, II and III on Fig. 3), said portion of circuit 10 belonging to the rocket that is being considered is connected with the portion of circuit 10 belonging to the rocket located thereabove.

Switches 14 and 15 are provided with resilient return means urging them toward the respective positions thereof illustrated by Fig. 4, such return means being for instance constituted by mere springs.

Fig. 3 shows that if, by operating control switch 12, a current pulse is sent from source 8 through circuit 10, this pulse does not act upon primer 7 but reaches rocket III the switch 14 of which connects contact 10a (belonging to circuit 10) with the terminal 13 of its primer 7. As the other terminal of said primer is connected through 9 with the other terminal of source 8, current is caused to flow through said primer and to operate it. Thus, rocket III is fired. As soon as said rocket III has been launched, the plate 5 of rocket II is retracted into horizontal position and causes the switch 14 of said rocket II to be swung into the position where it is capable of sending the next current pulse toward the primer 7 of said rocket II which has now become the first rocket to be fired. The same operation as above described takes place for firing rocket II and, finally, the plate 5 of the upper rocket I is in turn retracted, so that said rocket I can be launched by sending a new current pulse through circuit 10.

It should be pointed out that, in view of the fact that the retraction of the plate 5 of a rocket under the effect of the jet of propelling gases from the rocket located under it takes place at a speed which is constant and high, it will be possible, by giving the current pulse a suitable duration, to obtain, by means of this pulse, the successive firing of several rockets. A burst of rockets can thus be fired by holding switch 10 closed for a sufficient time.

However, if special precautions are not taken, the rate of fire of the rockets during this burst is very high and it is extremely difficult to fire the rockets successively at will.

Now, it may be of interest, in order to prevent mutual disturbances between the rockets which are fired successively at very short intervals, to slow down the rate of firing, and also to be able to fire the rockets successively just when it is desired.

The object of the present invention is to permit of obtaining these results.

According to this invention, means are provided for retarding the operation of the firing device of a rocket, when said rocket becomes the first one to be fired, for a time which is either predetermined or fixed by the person who controls firing.

For this purpose, it is possible to provide switch 14 with delay means which slow down the movement of said switch 14 which inserts the primer of the rocket into the electric circuit.

Such delay means may be constituted in one of the following manners.

In the embodiment of Fig. 4a, a set of pinions 100 cooperates with a rack 101 carried by switch 14, the angular inertia of said set of pinions slowing down the movement of the switch.

In the embodiment of Fig. 4b, a dash-pot 102 is inserted between the frame of the rocket and the movable arm of switch 14.

In the construction of Fig. 4c, an electromagnet 103 prevents the shifting of the movable arm of switch 14 into firing position, said electromagnet being inserted in a circuit including, on the one hand a contact 104 which is closed only when plate 5 is brought into retracted position, and on the other hand a cut-out fuze 105 which is melted with some delay, so as then to place electromagnet 103 out of circuit and to release the arm of switch 14.

Such retarding means make it possible, if control switch 12 is quickly reopened, to prevent the successive firing of several rockets.

It seems however more advantageous to make use of means such as shown by Figs. 5 and 6.

According to this embodiment of the system, an electromagnet 17 capable, when energized, of holding the arm of switch 14 in the position where the corresponding primer 7 is left out of the electric circuit, is mounted in said circuit between contact 10a and line 9. This electromagnet is therefore excited during the whole time of the pulse, keeping switch 14 in neutral position. As soon as the current pulse ceases, the switch 14 of the first rocket to be fired is released from the holding action of its electro-magnet 17 and comes, under the action of resilient means which will be hereinafter described, into the position where the primer 7 of the rocket is in series in the ignition circuit. A new pulse, transmitted through circuit 10, will then cause this rocket to be fired.

In order to avoid the necessity of having current flowing through all the electro-magnets 17 when one rocket is being fired, it is advantageous to make use of the arrangement illustrated by Fig. 6. In this case, the feed circuit of electro-magnet 17 contains a switch 18 arranged in such manner as to be closed when the plate 5 of the corresponding rocket starts retracting. However, said switch 18 must be close before switch 14 has reached its circuit closing position.

Figs. 7 to 9 illustrate the construction and arrangement of the elements of the ignition device in the nozzle 2a of each rocket.

Switch 15 is constituted by a sliding contact 15a slidable against the action of a spring 15b and capable of occupying either of two positions, to wit:

on the one hand, before the rocket has been hung from the rocket located above it, a position where the contact 15a is applied against an abutment 15c which is earthed (i.e. connected with the metallic structure of the system), said contact 15a then projecting from the rear face of the nozzle 2a of the rocket, and on the other hand, once the rocket has been hung from the plate 5 of the rocket located above it (which plate then pushes back contact 15a forwardly, that is to say toward the left of Figs. 7 to 9 so that said contact 15a is moved away from the earthed abutment 15c), a position where contact 15a is in contact with a stud 19 provided in the plate 5 of the supporting rocket, this stud 19 being connected with the portion of the ignition circuit 10 carried by said supporting rocket, whereas contact 15a is connected with the portion of said circuit 10 carried by the rocket that is being considered.

As for switch 14, it is constituted by a resilient rod 14a connected with one terminal of primer 7 and having one end held in a block 14b of an insulating material, the other end of said rod being adapted to be lifted by the plate 5 of the rocket when said plate is swung downwardly so as to permit of hanging another rocket therefrom.

When plate 5 is retracted (case of rocket III on Fig. 7), the flexible rod 14a bears upon contact 10a belonging to circuit 10 and, when plate 5 is in active position (case of rocket II on Fig. 7), said flexible rod 14a is at a distance from contact 10a and bears only upon plate 5 which is earthed.

Fig. 7 corresponds to the embodiment of Fig. 3.

Fig. 8 corresponds to the lay-out of Fig. 5. It includes, in addition to the elements above described, an electromagnet 17 acting as explained with reference to Fig. 5. Fig. 9, which corresponds to the lay-out of Fig. 6, further includes a switch 18 controlled by plate 5 (through means diagrammatically represented at 20, adapted to close switch 18 as soon as plate 5 starts toward its retracted position and before flexible rod 14a has left electromagnet 17).

Of course, the wing 1 of the aircraft must be provided, for every cluster of rockets to be hung therefrom, with means for fixing the upper rocket of every cluster to said wing, and connecting means for the electric ignition device of said cluster.

In the construction diagrammatically illustrated by Fig. 10, there is provided a conductor 10 for every cluster and it is necessary, in this case, to provide selector means 16 for choosing which cluster, or clusters, is, or are, to be fired.

In the construction of Fig. 11, there is a single connecting conductor 10 common to all the clusters shown, and it is no longer necessary to provide such selector means, control of the firing of the rockets being effected by means of control switch 12.

In a general manner, while I have, in the above description, disclosed what I deem to be practical and efficient embodiments of my invention, it should be well understood that I do not wish to be limited thereto as there might be changes made in the arrangement, disposition and form of the parts without departing from the principle of the present invention as comprehended within the scope of the accompanying claims.

What I claim is:

1. For use in connection with a support, the combination of at least two rockets, a supporting one and a supported one, holding means carried by said support for detachably connecting said supporting rocket with said support, holding means carried by said supporting rocket for detachably connecting said supported rocket with said supporting rocket, holding means carried by said supported rocket and capable of connecting still another rocket with said supported rocket, a member movably carried by said support, a member movably carried by each of said two first mentioned rockets, each of said three members being arranged to occupy either an active position when a rocket is actually connected through the holding means corresponding to said member or a retracted position when no rocket is being connected through said last mentioned holding means, a source of electric current carried by said support, an electric igniting device carried by each of said two first mentioned rockets, each of said devices including a primer operable by electric current caused to flow therethrough, an insulated contact carried by each of said two first mentioned rockets, electrical circuit means for connecting one terminal of said source in parallel with one terminal of each of said primers, electrical circuit means for connecting the other terminal of said source in series with said insulated contact of said supporting rocket and thence with said insulated contact of said supported rocket, a control switch carried by said support inserted in one of said circuit means, switch means operatively connected with each of said members for holding the other terminal of the corresponding primer electrically connected with said first mentioned circuit means as long as said member is in active position and for shifting said last mentioned terminal from electric connection with said first mentioned circuit means into electric connection with said insulated contact of the corresponding rocket in response to a displacement of said member into retracted position, and means for preventing the operation of said switch means in immediate automatic response to said displacement of said corresponding member into retracted position.

2. For use in connection with a support, the combination of at least two rockets, a supporting one and a supported one, holding means carried by said support for detachably connecting said supporting rocket with said support, holding means carried by said supporting rocket for detachably connecting said supported rocket with said supporting rocket, holding means carried by said supported rocket and capable of connecting still another rocket with said supported rocket, a member movably carried by said support, a member movably carried by each of said two first mentioned rockets, each of said three members being arranged to occupy either an active position when a rocket is actually connected through the holding means corresponding to said member or a retracted position when no rocket is being connected through said last mentioned holding means, a source of electric current carried by said support, an electric igniting device carried by each of said two first mentioned rockets, each of said devices including a primer operable by electric current caused to flow therethrough, an insulated contact carried by each of said two first mentioned rockets, electrical circuit means for connecting one terminal of said source in parallel with one terminal of each of said primers, electrical circuit means for connecting the other terminal of said source in series with said insulated contact of said supporting rocket and thence with said insulated contact of said supported rocket, a control switch carried by said support inserted in one of said circuit means, switch means operatively connected with each of said members for holding the other terminal of the corresponding primer electrically connected with said first mentioned circuit means as long as said member is in active position and for cutting off said last mentioned terminal from said first mentioned circuit means in response to a displacement of said member into retracted position, said switch means being capable, for one position thereof, when said member is in retracted position, of connecting said last mentioned terminal with said insulated contact of the corresponding rocket, resilient means for urging said switch means toward said position, and delay means for retarding the movement of said switch means into said last mentioned position under the action of said resilient means.

3. A combination according to claim 2 in which said delay means are electrical means.

4. For use in connection with a support, the combination of at least two rockets, a supporting one and a supported one, holding means carried by said support for detachably connecting said supporting rocket with said support, holding means carried by said supporting rocket for detachably connecting said supported rocket with said supporting rocket, holding means carried by said supported rocket and capable of connecting still another rocket with said supported rocket, a member movably carried by said support, a member movably carried by each of said two first mentioned rockets, each of said three members being arranged to occupy either an active position when a rocket is actually connected through the holding means corresponding to said member or a retracted position when no rocket is being connected through said last mentioned holding means, a source of electric current carried by said support, an electric igniting device carried by each of said two first mentioned rockets, each of said devices including a primer operable by electric current caused to flow therethrough, an insulated contact carried by each of said two first mentioned rockets, electrical circuit means for connecting one terminal of said source in parallel with one terminal of each of said primers, electrical circuit means for connecting the other terminal of said source in series with said insulated contact of said supporting rocket and thence with said insulated contact of said supported rocket, a control switch carried by said support inserted in one of said circuit means, switch means operatively connected with each of said members for holding the other terminal of the corresponding primer electrically connected with said first mentioned circuit means as long as said member is in active position and for cutting off said last mentioned terminal from said last mentioned circuit means in response to a displacement of said member into retracted position, said switch means being capable, for one position thereof, when said member is in retracted position, of connecting said last mentioned terminal with said insulated contact of the corresponding rocket, resilient means for urging said switch means toward said position, and electric means operative by the flow of current through said circuit means for preventing said switch means from coming into said last mentioned position as long as current is supplied from said source to said circuit means.

5. A combination according to claim 4 in which said electric means consist of an electro-magnet inserted between said first mentioned terminal of said primer and the corresponding insulated contact, said switch means including a metallic movable part arranged to be held by said electro-magnet, when it is excited, away from the position corresponding to said position of said switch means.

6. A combination according to claim 4 in which said electric means consist of an electro-magnet inserted between said first mentioned terminal of said primer and the corresponding insulated contact, said switch means including a metallic movable part arranged to be held by said electro-magnet, when it is excited, away from the position corresponding to said position of said switch means, and normally open switch means inserted in series with said electro-magnet between said insulated contact and said primer first mentioned terminal, and means operatively connected with said member for closing said last mentioned switch means when said member is starting from its active position toward its retracted position.

7. For use in connection with a support, the combination of at least two rockets, a supporting one and a supported one, holding means carried by said support for detachably connecting said supporting rocket with said support, holding means carried by said supporting rocket for detachably connecting said supported rocket with said supporting rocket, holding means carried by said supported rocket and capable of connecting still another rocket with said supported rocket, a member movably carried by said support, a member movably carried by each of said two first mentioned rockets, each of said three members being arranged to occupy either an active positon when a rocket is actually connected through the holding means corresponding to said member, said member in said active position being disposed in the path of the jet of propelling gases which is to flow from said last mentioned rocket when it is fired, or a retracted position under the effect of said jet of gases when said last mentioned rocket is fired, a source of electric current carried by said support, an electric igniting device carried by each of said two first mentioned rockets, each of said devices including a primer operable by electric current caused to flow therethrough, an insulated contact carried by each of said two first mentioned rockets, electrical circuit means for connecting one terminal of said source in parallel with one terminal of each of said primers, electrical circuit means for connecting the other terminal of said source in series with said insulated contact of said supporting rocket and thence with said insulated contact of said supported rocket, a control switch carried by said support inserted in one of said circuit means, and switch means operatively connected with each of said members for holding the other terminal of the corresponding primer electrically connected with said first mentioned circuit means as long as said member is in active position and for shifting said last mentioned terminal from electric connection with said contact of the corresponding rocket into electric connection with said insulated contact of the corresponding rocket in response to a displacement of said member into retracted position.

8. A combination according to claim 7 in which said members belong to said holding means, respectively.

9. A combination according to claim 7 in which said members belong to said holding means, respectively, each of said members being a plate pivoted about a horizontal axis at right angles to the direction of the rockets so as to be pivoted rearwardly by the jet of propelling gases.

10. For use in connection with a support, the combination of at least two rockets, a supporting one and a supported one, holding means carried by said support for detachably connecting said supporting rocket with said support, holding means carried by said supporting rocket for detachably connecting said supported rocket with said supporting rocket, holding means carried by said supported rocket and capable of connecting still another rocket with said supported rocket, a member movably carried by said support, a member movably carried by each of said two first mentioned rockets, each of said three members being arranged to occupy either an active position when a rocket is actually connected through the holding means corresponding to said member or a retracted position when no rocket is being connected through said last mentioned holding means, whereby, as long as said supported rocket is being connected with said supporting rocket and no other rocket is being supported by said supported rocket, the movable member of said supported rocket is in retracted position and the movable member of said supporting rocket is in active position, a source of electric current carried by said support, an electric igniting device carried by each of said two first mentioned rockets, each of said devices including a primer operable by electric current caused to flow therethrough, a first electric circuit for connecting the terminals of said source with the terminals of the primer of said supporting rocket, a switch in said electric circuit, a second electric circuit mounted across the terminals of said last mentioned primer, the primer of said supported rocket being inserted in said second circuit, switch means in each of said circuits respectively, each of said switch means being operatively connected with the corresponding movable member so as to be held by it in the position where the corresponding circuit is open as long as said corresponding movable member is in active position and to be released by said movable member when said member is brought into retracted position, resilient means for urging each of said switch means toward circuit closing position and means for preventing automatic immediate returns of said switch means into circuit closing position under the action of said switch means in response to the shifting of the corresponding movable member into retracted position.

References Cited in the file of this patent

UNITED STATES PATENTS

| | | |
|---|---|---|
| 2,351,336 | Hooven | June 13, 1944 |
| 2,788,712 | Kuller | Apr. 16, 1957 |
| 2,792,756 | Schneiter | May 2, 1957 |
| 2,832,265 | Reid et al. | Apr. 29, 1958 |
| 2,844,073 | Re et al. | July 22, 1958 |
| 2,845,004 | Johnson | July 29, 1958 |